(12) United States Patent
Mason

(10) Patent No.: US 10,885,013 B2
(45) Date of Patent: Jan. 5, 2021

(54) AUTOMATED APPLICATION LIFECYCLE TRACKING USING BATCH PROCESSING

(71) Applicant: JPMorgan Chase Bank, N.A., New York, NY (US)

(72) Inventor: Jenese D. Mason, Tampa, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 314 days.

(21) Appl. No.: 14/744,614

(22) Filed: Jun. 19, 2015

(65) Prior Publication Data

US 2015/0370774 A1 Dec. 24, 2015

Related U.S. Application Data

(60) Provisional application No. 62/014,908, filed on Jun. 20, 2014.

(51) Int. Cl.
*G06F 17/00* (2019.01)
*G06F 16/23* (2019.01)
*G06F 8/70* (2018.01)

(52) U.S. Cl.
CPC ............... *G06F 16/23* (2019.01); *G06F 8/70* (2013.01)

(58) Field of Classification Search
CPC .......... G06F 8/70; G06F 17/27; G06F 17/246; G06F 17/30345
USPC ................................................. 715/224, 255
See application file for complete search history.

(56) References Cited

U.S. PATENT DOCUMENTS

| | | | | |
|---|---|---|---|---|
| 7,644,351 | B1* | 1/2010 | Portnoy | G06F 17/243 715/224 |
| 7,870,477 | B2* | 1/2011 | Perelman | G06F 17/243 715/221 |
| 8,234,561 | B1* | 7/2012 | Bourdev | G06F 17/243 715/224 |
| 8,707,157 | B1* | 4/2014 | Chouhan | G06F 17/243 715/222 |
| 8,745,572 | B2* | 6/2014 | Zimmermann | G06F 11/3604 717/101 |
| 2003/0233419 | A1* | 12/2003 | Beringer | G06Q 10/107 709/206 |
| 2005/0165819 | A1* | 7/2005 | Kudoh | G06F 16/355 |
| 2007/0168914 | A1* | 7/2007 | Reddy | G06Q 10/00 717/101 |
| 2007/0237427 | A1* | 10/2007 | Patel | G06K 9/00442 382/305 |
| 2008/0072133 | A1* | 3/2008 | Eckelman | G06F 17/243 715/224 |

(Continued)

*Primary Examiner* — Stephen S Hong
*Assistant Examiner* — Matthew J Ludwig
(74) *Attorney, Agent, or Firm* — Greenblum & Bernstein, P.L.C.

(57) ABSTRACT

Automated application lifecycle tracking includes receiving a plurality of electronic messages associated with an application development project from one or more computers. One or more scanning parameters associated with the plurality of electronic messages are identified, and a database entry template is generated for an application lifecycle management module. An electronic message from the plurality of electronic messages is selected for analysis. The selected electronic message is analyzed according to the one or more identified scanning parameters to identify data within the electronic message, and fields of the database entry template are populated based on the identified data.

21 Claims, 4 Drawing Sheets

(56) References Cited

U.S. PATENT DOCUMENTS

| | | | |
|---|---|---|---|
| 2009/0037378 A1* | 2/2009 | Moor | G06F 17/243 |
| 2009/0234818 A1* | 9/2009 | Lobo | G06F 17/30719 |
| 2011/0179049 A1* | 7/2011 | Caldwell | G06Q 10/00 |
| | | | 707/755 |
| 2011/0271173 A1* | 11/2011 | Ait-Mokhtar | G06F 17/243 |
| | | | 715/226 |
| 2012/0030157 A1* | 2/2012 | Tsuchida | G06F 40/295 |
| | | | 706/20 |
| 2012/0063684 A1* | 3/2012 | Denoue | G06F 17/243 |
| | | | 382/175 |
| 2013/0124961 A1* | 5/2013 | Linburn | G06F 17/243 |
| | | | 715/224 |
| 2014/0032683 A1* | 1/2014 | Maheshwari | H04L 51/063 |
| | | | 709/206 |
| 2016/0182417 A1* | 6/2016 | Cordes | H04L 51/08 |
| | | | 709/206 |

* cited by examiner

AUTOMATED APPLICATION LIFECYCLE TRACKING USING BATCH PROCESSING

RELATED APPLICATIONS

This application claims priority under 35 U.S.C. § 119 of provisional application Ser. No. 62/014,908, filed Jun. 20, 2014, entitled, "Systems and Methods for Automated Application Lifecycle Tracking," which is hereby incorporated by reference.

TECHNICAL FIELD

This invention relates generally to application lifecycle management, and more particularly to automated application lifecycle tracking using batch processing.

BACKGROUND

Technology development teams are often faced with the challenges of adequately tracking parameters, such as issues, defects, and requirements, associated with the development lifecycle of applications. Application lifecycle management (ALM) software helps to alleviate these challenges by providing a platform for project management from application development through deployment, which drives the entire development lifecycle.

SUMMARY

According to embodiments of the present disclosure, disadvantages and problems associated with automated application lifecycle tracking may be reduced or eliminated.

In certain embodiments, automated application lifecycle tracking includes receiving an electronic message associated with an application development project from a computer. A project detail is identified within the electronic message and the project detail is associated with an identifier in a project database of an application lifecycle management module. A database entry is generated based on at least the identified project detail. A notification is received from the computer confirming the generated database entry, and the generated database entry is communicated to the application lifecycle management module.

In other embodiments, a plurality of electronic messages associated with an application development project from one or more computers. One or more scanning parameters associated with the plurality of electronic messages are identified, and a database entry template is generated for an application lifecycle management module. An electronic message from the plurality of electronic messages is selected for analysis. The selected electronic message is analyzed according to the one or more identified scanning parameters to identify data within the electronic message, and fields of the database entry template are populated based on the identified data.

Certain embodiments of the present disclosure may provide one or more technical advantages. A technical advantage of one embodiment includes automatically determining an issue, defect, and/or requirement of the lifecycle of application development by analyzing electronic messages. Another technical advantage of an embodiment includes recording each issue, defect, and/or requirement in a lifecycle management tool for additional analysis, reporting, and maintenance. Yet another technical advantage of an embodiment includes tracking each issue, defect, and/or requirement associated with application development.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION

Embodiments of the present invention and its advantages are best understood by referring to FIGS. 1 through 5 of the drawings, like numerals being used for like and corresponding parts of the various drawings.

Technology development teams are often faced with the challenges of adequately tracking parameters, such as issues, defects, and requirements, associated with the development lifecycle of applications. Application lifecycle management (ALM) software helps to alleviate these challenges by providing a platform for project management from application development through deployment, which drives the entire development lifecycle.

Electronic messages often serve as an effective method for tracking project parameters in conjunction with ALM software. Typically, a responsible party reviews the electronic message from an application development team to ensure that proper documentation and tracking is performed in an orderly and accurate manner. Proper tracking of important parameters, however, involves recording relevant data into an ALM database by the responsible party, which has considerable time costs and may grow increasingly overwhelming as the development process progresses.

The current disclosure recognizes the need for a system and method to automatically track an application's lifecycle using electronic messages. In an embodiment, an electronic message may be received and certain project information associated with application development may be identified from the electronic message. The project information may be associated with an identifier in the application project database, which facilitates tracking of the project. A database entry for the project is generated according to the project detail from the electronic message. An administrator or application developer may confirm the project detail, and the project database is updated to include the generated database entry.

Figure 1:
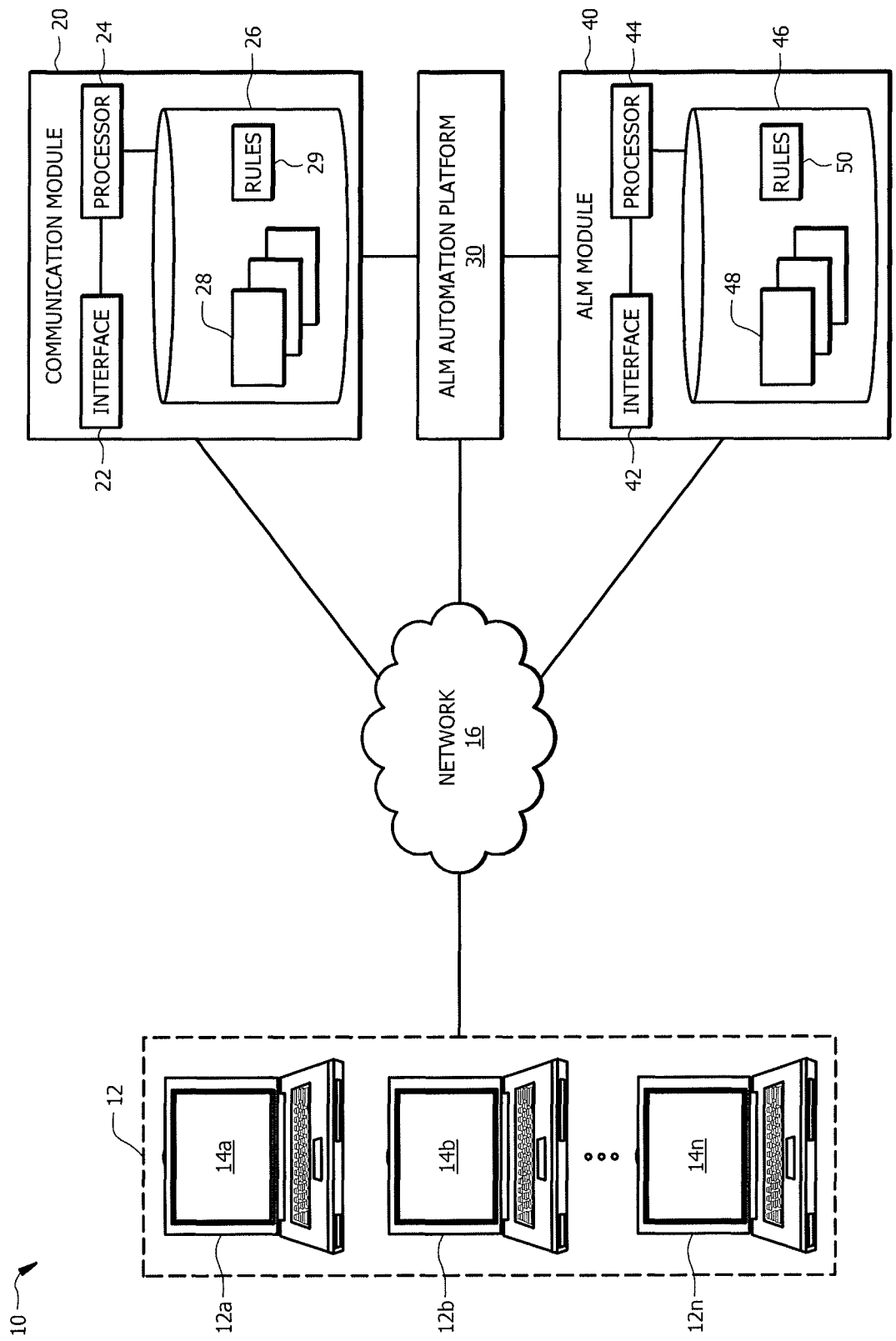
FIG. 1 illustrates a block diagram of an embodiment of a system for automated application lifecycle tracking.

FIG. 1 illustrates a block diagram of an embodiment of a system 10 for automated application lifecycle tracking. System 10 includes computers 12, communication module 20, ALM automation platform 30, and ALM module 40 that communicate over one or more networks 16. System 10 implements automated application lifecycle tracking by analyzing electronic messages to determine project detail associated with application development projects and updating the project detail in ALM module 40.

System 10 includes computers 12*a*-12*n*, where n represents any suitable number, that communicate with communication module 20, ALM automation platform 30, and ALM module 40 through network 16. For example, computer 12 communicates electronic messages to communication module 20 to provide information regarding application development projects. As another example, computers 12 receive notifications from ALM automation platform 30 regarding updates to application development projects, and communicate confirmations of the updates to ALM automation platform 30. Computer 12 may include a personal computer, a workstation, a laptop, a wireless or cellular telephone, an electronic notebook, a personal digital assistant, a smartphone, a netbook, a tablet, a slate personal computer, or any other device (wireless, wireline, or otherwise) capable of receiving, processing, storing, and/or communicating information with other components of system 10. Computer 12 may communicate with other components of system 10 using any suitable communication channel, such as e-mail, short message service (SMS), instant message, automated voice message, any other suitable communication technique, or any other suitable combination of the preceding. Computer 12 may also comprise a user interface, such as a display, keyboard, mouse, or other appropriate terminal equipment.

In the illustrated embodiment, computer 12 includes a graphical user interface ("GUI") 14 that displays information received from communication module 20, ALM automation platform 30, and ALM module 40. For example, GUI 14 may display updates associated with an application development project to a user of computer 12. As another example, GUI 14 may display the lifecycle of an application project from ALM module 40. As yet another example, GUI 14 may facilitate retrieving project details for a project stored in other components of system 10.

GUI 14 is generally operable to tailor and filter data entered by and presented to the user. GUI 14 may provide the user with an efficient and user-friendly presentation of information using a plurality of displays having interactive fields, pull-down lists, and buttons operated by the user. GUI 14 may include multiple levels of abstraction including groupings and boundaries. It should be understood that the term GUI 14 may be used in the singular or in the plural to describe one or more GUIs 14 in each of the displays of a particular GUI 14.

In an embodiment, GUI 14 may be a web browser interface that can access, retrieve, present, and/or navigate content, such as web pages using Hyper Text Markup Language (HTML) pages, send and receive electronic messages, or other information. In another embodiment, GUI 14 may be a standalone application, such as a mobile application, a desktop application, or a Java applet, which may be installed on computer 12. In yet another embodiment, GUI 14 may include a plug-in that runs on a pre-existing software platform installed on computer 12. For example, ALM automation platform 30 may be implemented on computer 12 as an ALM application tracking tool, which may have been packaged as an archived file or an executable file and installed on computer 12. After installation, the ALM application tracking tool may be implemented as a standalone application or as a plug-in within GUI 14 that can be initiated by the user by selecting a macro button within an e-mail application.

Network 16 represents any suitable network operable to facilitate communication between the components of system 10, such as computers 12, communication module 20, ALM automation platform 30 and ALM module 40. Network 16 may include any interconnecting system capable of transmitting audio, video, signals, data, messages, or any combination of the preceding. Network 16 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, a cellular network, an enterprise intranet, or any other suitable communication link, including combinations thereof, operable to facilitate communication between the components.

Communication module 20 represents any suitable components that facilitate communication of electronic messages between computers 12 and ALM automation platform 30 and ALM module 40. Communication module 20 may implement any one of a plurality of communication methods, including e-mail, instant messaging, SMS, automated voice message, any other suitable communication technique, or any suitable combination of the preceding. For example, computer 12 may be associated with an e-mail account maintained by communication module 20. As another example, computer 12 may be associated with an SMS account maintained by communication module 20.

Communication module 20 may include a network server, any suitable remote server, a mainframe, a host computer, a workstation, a web server, a personal computer, a file server, or any other suitable device operable to communicate with other components in system 10 and process data and communication messages. In some embodiments, communication module 20 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of communication module 20 may be performed by any suitable combination of one or more servers or other components at one or more locations. In the embodiment where the module is a server, the server may be a private server, and the server may be a virtual or physical server. Also, communication module 20 may include any suitable component that functions as a server. In the illustrated embodiment, communication module 20 includes network interface 22, processor 24, and memory 26.

Network interface 22 represents any suitable device operable to receive information from network 16, transmit information through network 16, perform processing of information, communicate with other devices, or any combination of the preceding. For example, network interface 22 receives electronic messages from computers 12. As another example, network interface 22 receives notifications from ALM automation platform 30 that are being communicated to computers 12. As yet another example, network interface 22 may communicate confirmation information from computers 12 to ALM automation platform 30. Network interface 22 represents any port or connection, real or virtual, including any suitable hardware and/or software, including protocol conversion and data processing capabilities, to communicate through a LAN, WAN, MAN, or other communication system that allows communication module 20 to exchange information with network 16, computers 12, ALM automation platform 30, ALM module 40, or other components of system 10.

Processor 24 communicatively couples to network interface 22 and memory 26, and controls the operation and administration of communication module 20 by processing information received from network interface 22 and memory 26. Processor 24 includes any hardware and/or software that operates to control and process information. For example, processor 24 executes communication rules 29 to control the operation of communication module 20. Processor 24 may be a programmable logic device, a microcontroller, a microprocessor, any suitable processing device, or any suitable combination of the preceding.

Memory 26 stores, either permanently or temporarily, data, operational software, or other information for processor 24. Memory 26 includes any one or a combination of volatile or non-volatile local or remote devices suitable for storing information. For example, memory 26 may include Read Access Memory (RAM), Read Only Memory (ROM), magnetic storage devices, optical storage devices, a flash drive, a database system, or any other suitable information storage device or a combination of these devices. Memory 26 may also include multiple storage components that may span multiple computing devices and may also be cloud-based. In some embodiments, memory 26 may be separate from communication module 20, and may be, for example, distributed among and accessible to computers 12 or other components within system 10. In the illustrated embodiment, memory 26 includes message data 28 and communication rules 29.

Message data 28 generally refers to electronic messages communicated between components in system 10. Message data 28 may be in any suitable format to facilitate storing electronic messages from a plurality of components. Communication rules 29 generally refer to logic, rules, algorithms, code, tables, and/or other suitable instructions embodied in a computer-readable storage medium for performing the described functions and operations of communication module 20. For example, rules 29 facilitate how and when electronic messages are communicated between components in system 10.

ALM automation platform 30 represents any suitable components that facilitate analyzing electronic messages from computers 12 to determine project information for application development projects, to track the lifecycle of application development, to update project detail of an application development, or any other suitable functionality. ALM automation platform 30 may include a network server, any suitable remote server, a rack mount server, a router computer, a mainframe, a host computer, a workstation, a web server, a personal computer, a file server, or any other suitable device operable to communicate with other components in system 10. In some embodiments, ALM automation platform 30 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of ALM automation platform 30 may be performed by any suitable combination of one or more servers or other components at one or more locations. In the embodiment where the module is a server, the server may be a private server, and the server may be a virtual or physical server. Also, ALM automation platform 30 may include any suitable component that functions as a server. In an embodiment, ALM automation platform 30 is implemented on any one or more of computers 12, communication module 20, ALM module 40, any other suitable device, or any suitable combination of the preceding.

ALM module 40 represents any suitable components that facilitate application lifecycle management. ALM module 40 may store and process information regarding application development, such as project details, defects, updates, status, priority, risk, other suitable types of data, or any suitable combination of the preceding. Using ALM module 40, application development may be managed from initiation to deployment.

ALM module 40 may include a network server, any suitable remote server, a mainframe, a host computer, a workstation, a web server, a personal computer, a file server, or any other suitable device operable to communicate with other components in system 10 and process data and communication messages. In some embodiments, ALM module 40 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of ALM module 40 may be performed by any suitable combination of one or more servers or other components at one or more locations. In the embodiment where the module is a server, the server may be a private server, and the server may be a virtual or physical server. Also, ALM module 40 may include any suitable component that functions as a server. In the illustrated embodiment, ALM module 40 includes network interface 42, processor 44, and memory 46.

Network interface 42 represents any suitable device operable to receive information from network 16, transmit information through network 16, perform processing of information, communicate with other devices, or any combination of the preceding. For example, network interface 42 receives information regarding application development from computers 12. As another example, network interface 42 receives updates regarding application development from ALM automation platform 30. As yet another example, network interface 42 may receive database entries associated with an application development from ALM automation platform 30. Network interface 42 represents any port or connection, real or virtual, including any suitable hardware and/or software, including protocol conversion and data processing capabilities, to communicate through a LAN, WAN, MAN, or other communication system that allows ALM module 40 to exchange information with network 16, computers 12, communication module 20, ALM automation platform 30, or other components of system 10.

Processor 44 communicatively couples to network interface 42 and memory 46, and controls the operation and administration of ALM module 40 by processing information received from network interface 42 and memory 46. Processor 44 includes any hardware and/or software that operates to control and process information. For example, processor 44 executes ALM rules 50 to control the operation of ALM module 40. Processor 44 may be a programmable logic device, a microcontroller, a microprocessor, any suitable processing device, or any suitable combination of the preceding.

Memory 46 stores, either permanently or temporarily, data, operational software, or other information for processor 44. Memory 46 includes any one or a combination of volatile or non-volatile local or remote devices suitable for storing information. For example, memory 46 may include RAM, ROM, magnetic storage devices, optical storage devices, a flash drive, a database system, or any other suitable information storage device or a combination of these devices. Memory 46 may also include multiple storage components that may span multiple computing devices and may also be cloud-based. In some embodiments, memory 46 may be separate from ALM module 40, and may be, for example, distributed among and accessible to computers 12 or other components within system 10. Memory 46 may also be referred to as a project database. In the illustrated embodiment, memory 46 includes database entries 48 and ALM rules 50.

Database entries 48 generally refer to records, entries, or any suitable data structure that includes information related to an application development project. For example, database entries 48 may include details related to an application development project. As another example, database entries 48 may include information related to the lifecycle of an application development. Information in database entries 48 may be updated, retrieved, or accessed by any other component in system 10, such as computers 12, communication module 20, and/or ALM automation platform 30.

ALM rules 50 generally refer to logic, rules, algorithms, code, tables, and/or other suitable instructions embodied in a computer-readable storage medium for performing the described functions and operations of ALM module 40. For example, rules 50 may facilitate how ALM module 40 stores project detail in database entries 48.

In an exemplary embodiment of operation, computer 12 communicates a message using communication module 20 to ALM automation platform 30. The message indicates certain information associated with an application development project. The message may include any suitable information, such as the status of the project, the owner of the project, the deadline for the project, the creation date of the project, the type of application to be developed, the target release date for the project, the priority of the project, the impact of the project, the overall risk of the project, any other suitable information, or any suitable combination of the preceding. Upon receiving the message, ALM automation platform 30 determines the project detail within the message. The project detail may be associated with a project identifier, which identifies a project in memory 46 of ALM module 40. ALM automation platform 30 generates database entry 48 for storage in ALM module 40 based on the project detail in the message. Before storing database entry 48 in ALM module 40, ALM automation platform 30 may communicate database entry 48 to computer 12 for confirmation. Upon receiving confirmation of database entry 48, ALM automation platform 30 communicates the generated database entry 48 to ALM module 40 for storage. Generated database entry 48 is stored with the correct project because of the identifier initially linked to the project detail.

A component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the disclosure. For example, system 10 may include any number of computers 12, communication modules 20, ALM automation platform 30, and ALM module 40. Any suitable logic may perform the functions of system 10 and the components within system 10.

Figure 2:
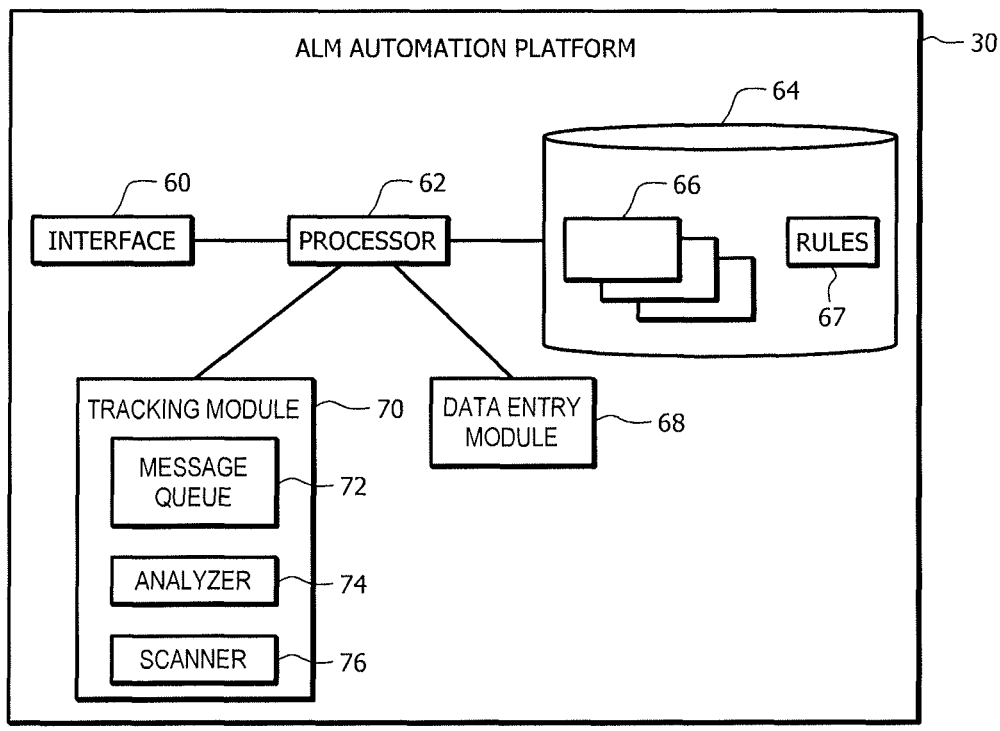
FIG. 2 illustrates a block diagram of an embodiment of an ALM automation platform.

FIG. 2 illustrates a block diagram of an embodiment of an ALM automation platform 30. As discussed above, ALM automation platform 30 facilitates the automation of application lifecycle tracking. For example, ALM automation platform 30 may include one or more modules configured to automatically scan and parse messages to identify ALM-relevant parameters and update ALM module 40 accordingly. In the illustrated embodiment, ALM automation platform 30 includes a network interface 60, a processor 62, a memory 64, a data entry module 68, and a tracking module 70.

Network interface 60 represents any suitable device operable to receive information from network 16, transmit information through network 16, perform processing of information, communicate with other devices, or any combination of the preceding. For example, network interface 60 receives information regarding application development from computers 12. As another example, network interface 60 communicates updates regarding application development to ALM module 40. As yet another example, network interface 60 communicates database entries associated with an application development to ALM module 40. Network interface 60 represents any port or connection, real or virtual, including any suitable hardware and/or software, including protocol conversion and data processing capabilities, to communicate through a LAN, WAN, MAN, or other communication system that allows ALM automation platform 30 to exchange information with network 16, computers 12, communication module 20, ALM module 40, or other components of system 10.

Processor 62 communicatively couples to network interface 60, memory 64, data entry module 68, and tracking module 70 and controls the operation and administration of ALM automation platform 30 by processing information received from network interface 60, memory 64, data entry module 68, and tracking module 70. Processor 62 includes any hardware and/or software that operates to control and process information. For example, processor 62 executes rules 67 to control the operation of ALM automation platform 30. Processor 62 may be a programmable logic device, a microcontroller, a microprocessor, any suitable processing device, or any suitable combination of the preceding.

Memory 64 stores, either permanently or temporarily, data, operational software, or other information for processor 62. Memory 64 includes any one or a combination of volatile or non-volatile local or remote devices suitable for storing information. For example, memory 64 may include RAM, ROM, magnetic storage devices, optical storage devices, a flash drive, a database system, or any other suitable information storage device or a combination of these devices. Memory 64 may also include multiple storage components that may span multiple computing devices and may also be cloud-based. In some embodiments, memory 64 may be separate from ALM automation platform 30, and may be, for example, distributed among and accessible to computers 12 or other components within system 10. In the illustrated embodiment, memory 64 includes ALM parameters 66 and rules 67.

ALM parameters 66 generally refer to project details for an application development project. ALM parameters 66 may indicate author, application, creation date, modification information, project, target release, priority, impact, overall risk, status, any other suitable parameter, or any other suitable combination of the preceding. Rules 67 generally refer to logic, rules, algorithms, code, tables, and/or other suitable instructions embodied in a computer-readable storage medium for performing the described functions and operations of ALM automation platform 30. In other embodiments, memory 64 may also include database records, database entry templates, database entries, or other suitable items that include application development information.

Data entry module 68 represents a component that generates database entries, generates database entry templates, and populates the fields of a database entry template based on identified information in an electronic message. Data entry module 68 may receive information from computers 12 that includes project detail for an application development project. For example, a user using computer 12 may enter project details into GUI 14 on computer 12 and the project details are communicated by communication module 20 to data entry module 68. Based on the received information, data entry module 68 may generate a database entry and/or a database entry template.

Tracking module 70 represents any suitable components that facilitate automatically tracking project details for an application development. Tracking module 70 obtains project details and, in an embodiment, generates a data structure based on the project details. The data structure may be a database entry that is stored in ALM module 40. In the illustrated embodiment, tracking module 70 comprises message queue 72, analyzer 74, and scanner 76.

Message queue 72 facilitates receiving and storing electronic messages for processing. In an embodiment, message queue 72 facilitates processing a plurality of electronic messages in parallel. Message queue 72 may receive electronic messages from any suitable source, such as computer 12, communication module 20, ALM module 40, data entry module 68, or any other component in ALM automation platform 30 or system 10. Message queue 72 may organize the electronic messages to allow for each message to be processed and project details extracted. Each electronic message stored in message queue 72 may be associated with a particular communication account of a user, a group of users, a user associated with a development team, and/or a development team.

Analyzer 74 represents any suitable components operable to analyze the electronic messages associated with application development. For example, analyzer 74 obtains identifiers, which may also be referred to as scanning parameters, that are associated with ALM module 40 and database entries 48 stored in memory 46. The identifiers, or scanning parameters, may be key words or phrases that appear adjacent to or within the area of other terms, phrases, values, or dates. In an embodiment, to obtain a list of identifiers, analyzer 74 may communicate with ALM module 40 to determine the identifiers from database entries 48. In another embodiment, analyzer 74 may receive a pre-defined list or lists of identifiers, which may be stored in memory 64. In an embodiment, analyzer 74 may analyze the electronic messages to determine project relevant information using the identifiers.

Scanner 76 represents any suitable components operable to extract information from electronic messages. For example, scanner 76 scans electronic messages and extracts project-relevant parameters and documents, such as attachments, from the electronic messages. As another example, scanner 76 may generate a template in which to store the project details. The template may be a blank template or the template may be based on a pre-existing database entry or records. Each template includes one or more fields in which to store project-related information. In an embodiment, scanner 76 may use the key words identified by analyzer 74 to determine the project-relevant parameters within the electronic message. Once the project-relevant parameters are determined, fields within the database entry template may be populated by a component within ALM automation platform 30. Any suitable component may populate the database entry, such as analyzer 74, scanner 76, tracking module 70, or data entry module 68.

More or less modules and components may be included in ALM automation platform 30 without loss of generality. For example, two or more of the modules may be combined into a single module, or one of the modules may be divided into two or more modules. In one embodiment, one or more of the modules may reside on different computing devices (e.g., different server computers, on a single client device, distributed among multiple client devices, etc.).

Figure 3:
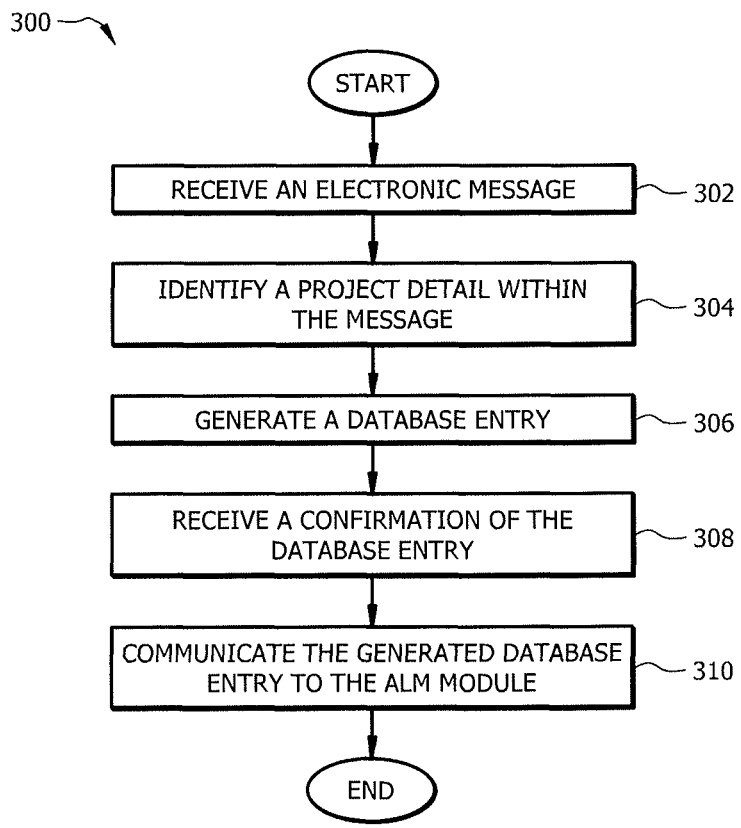
FIG. 3 illustrates a flowchart illustrating a method for automated application lifecycle tracking.

FIG. 3 illustrates a flowchart 300 illustrating a method for automated application lifecycle tracking. In an embodiment, ALM automation platform 30 performs the steps of flowchart 300. At step 302, ALM automation platform 30 receives an electronic message. In an embodiment, the electronic message is an e-mail selected by a user using computer 12. The electronic message may be communicated to ALM automation platform 30. In another embodiment, the electronic message may be received from a device other than computer 12.

At step 304, ALM automation platform 30 identifies a project detail within the electronic message. For example, ALM automation platform 30 uses scanner 76 to determine the project detail within the electronic message. The project detail may be associated with an identifier of a project in ALM module 40. Therefore, scanner 76 may determine the project detail and the project for which the detail applies. In certain embodiments, ALM automation platform 30 identifies more than one project detail within the electronic message.

At step 306, ALM automation platform 30 generates a database entry. For example, data entry module 68 generates the database entry. In another embodiment, tracking module 70 generates the database entry. The database entry may be generated based at least in part on the determined project detail. In some embodiments, the database entry is generated based on more than one determined project details.

At step 308, ALM automation platform 30 receives a confirmation of the database entry. For example, after the database entry is generated, ALM automation platform 30 communicates the generated database entry to computer 12 for review by a user. Computer 12 may display the generated database entry using GUI 14. The user reviews the generated database entry and updates the database entry if necessary. Updates to the generated database entry include, but are not limited to, overwriting values, deleting values, adding values, changing values, or any other suitable action. The user may approve the database entry by selecting an option to export the database entry to ALM module 40.

At step 310, ALM automation platform 30 communicates the generated database entry to ALM module 40. ALM module 40 may then update memory 46 to include the generated database entry.

Modifications, additions, or omissions may be made to flowchart 300 depicted in FIG. 3. The method may include more, fewer, or other steps. Additionally, steps may be performed in parallel or in any suitable order. While discussed as ALM automation platform 30 performing the steps, any suitable component of system 10 may perform one or more steps of the method.

Figure 4:
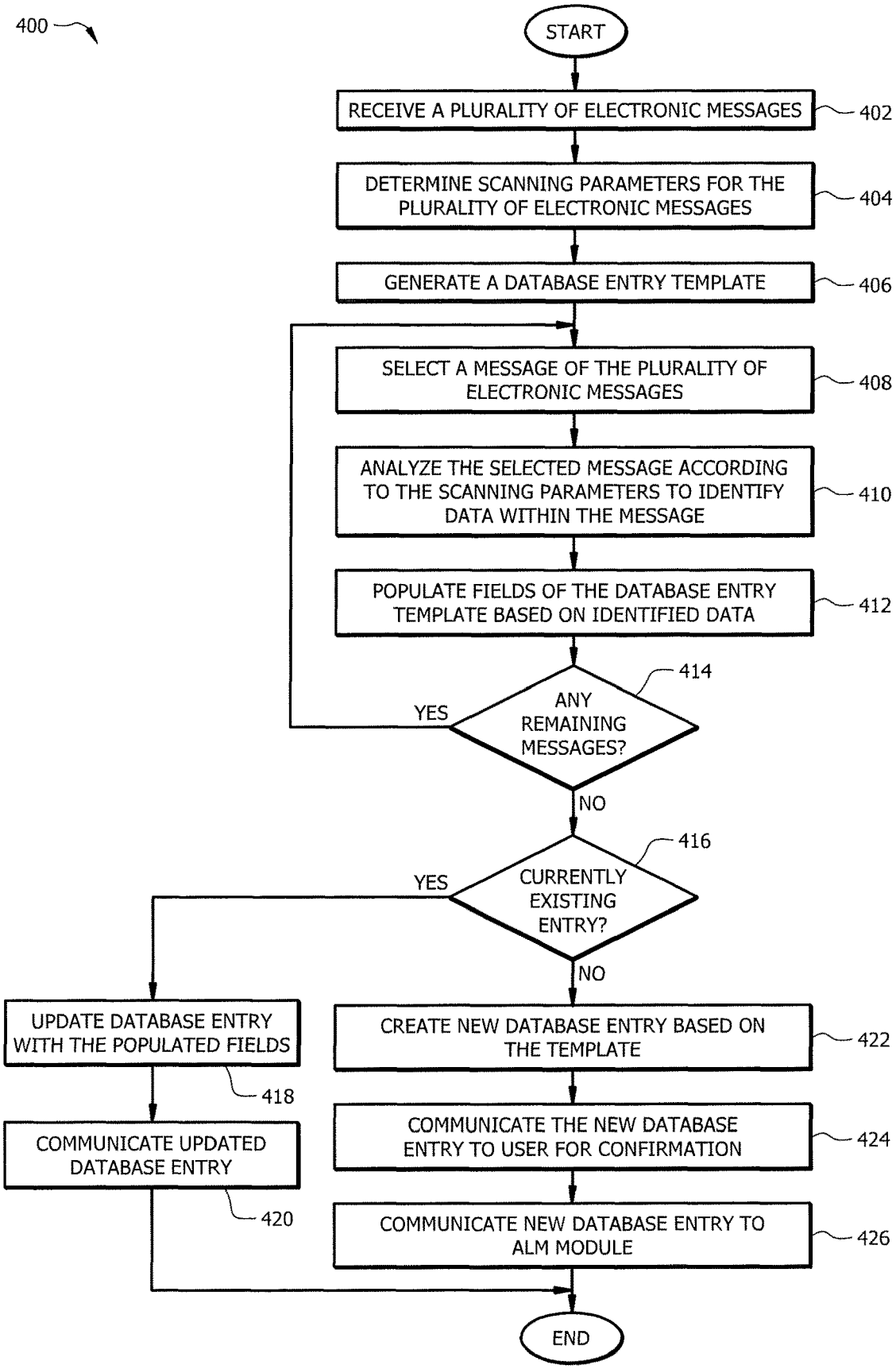
FIG. 4 illustrates a flowchart illustrating a method for batch processing messages for automated application lifecycle tracking.

FIG. 4 illustrates a flowchart 400 illustrating a method for batch processing messages for automated application lifecycle tracking. In one embodiment, flowchart 400 is performed by ALM automation platform 30. At step 402, ALM automation platform 30 receives a plurality of electronic messages. The project details within the messages are to be imported into ALM module 40.

At step 404, ALM automation platform 30 determines scanning parameters for the plurality of electronic messages. In an embodiment, analyzer 74 determines the scanning parameters from ALM module 40. For example, ALM automation platform 30 may retrieve the parameters from ALM module 40, such as from a currently existing project, a database entry, or other information. ALM automation platform 30 may also identify the parameters, such as keywords, within the data. In other embodiments, ALM automation platform 30 determines parameters that were previously obtained and stored in memory 66.

At step 406, ALM automation platform 30 generates a database entry template. Any suitable component within ALM automation platform 30 may generate the data entry template, such as data entry module 68 or scanner 76. In some embodiments, the database entry template may be generated in response to a user input. In some embodiments, the database entry template may be generated based on a pre-existing database entry, and may include data that is already included in the pre-existing database entry. For example, a user may have selected to open the pre-existing database entry. The template may be a blank database entry, or may have one or more fields filled with default data.

At step 408, ALM automation platform 30 selects a first message of the plurality of electronic messages. Message queue 72 may store the plurality of electronic messages from which the first message is selected. The message may be selected based on any suitable criteria, such as a user selection, priority, time parameters, or other criteria.

At step 410, ALM automation platform 30 analyzes the selected message according to the scanning parameters to identify data within the message. In an embodiment, ALM automation platform 30 uses scanner 76 to apply the scanning parameters. The scanning parameters may be used to identify project-relevant details based on key words associated with ALM module 40 and/or an application development project. At step 412, ALM automation platform 30 populates fields of the database entry template based on the identified data. In an embodiment, data entry module 68 may be used to populate the database entry template with the identified information.

At step 414, ALM automation platform 30 determines whether there are any remaining electronic messages that have not been processed. If there are remaining messages, flowchart 400 proceeds to step 408 where the next message is selected. If there are no remaining messages and all of the plurality of electronic messages have been processed, flowchart 400 proceeds to step 416, where ALM automation platform 30 determines if there is already a currently existing database entry corresponding to the populated template.

If a database entry currently exists, the method continues to step 418. For example, this determination may be made in response to a user request to open a previously existing database entry. In some embodiments, ALM automation platform 30 may associate the populated template with a pre-existing database entry to avoid duplication. In another embodiment, ALM automation platform 30 may communicate information corresponding to the pre-existing database entry and the populated template to computer 12, and the user may be able to view a side-by-side comparison. For example, the user may have an option to select to overwrite certain fields of the database entry based on the results of the scanning performed by ALM automation platform 30 and/or reject certain fields.

At step 418, ALM automation platform 30 updates the database entry based on the populated fields. At step 420, ALM automation platform 30 communicates the updated database entry to ALM module 40, and memory 46 within ALM module 40 may be updated with the information.

If a database entry does not currently exist, the method continues to step 422. At step 422, a new database entry is generated based on the template. In an embodiment, data entry module 68 generates the new database entry based on the template. At step 424, ALM automation platform 30 communicates the new database entry to computer 12 for confirmation. For example, ALM automation platform 30 communicates the new database entry in an e-mail message to computer 12. Once the user confirms the new database entry, ALM automation platform 30 communicates the new database entry to ALM module 40 at step 426. The new database entry may be stored in memory 46.

Modifications, additions, or omissions may be made to flowchart 400 depicted in FIG. 4. The method may include more, fewer, or other steps. Additionally, steps may be performed in parallel or in any suitable order. While discussed as ALM automation platform 30 performing the steps, any suitable component of system 10 may perform one or more steps of the method.

Each of corresponding flowcharts 300 and 400 may be performed by processing logic that may include hardware; such as circuitry, dedicated logic, programmable logic, or microcode; software, such as instructions run on a processing device; or a combination thereof. In one embodiment, flowcharts 300 and 400 may be performed by one or more processing components associated with communication module 20, data entry module 68, and tracking module 70, which includes message queue 72, analyzer 74, and scanner 76.

Figure 5:
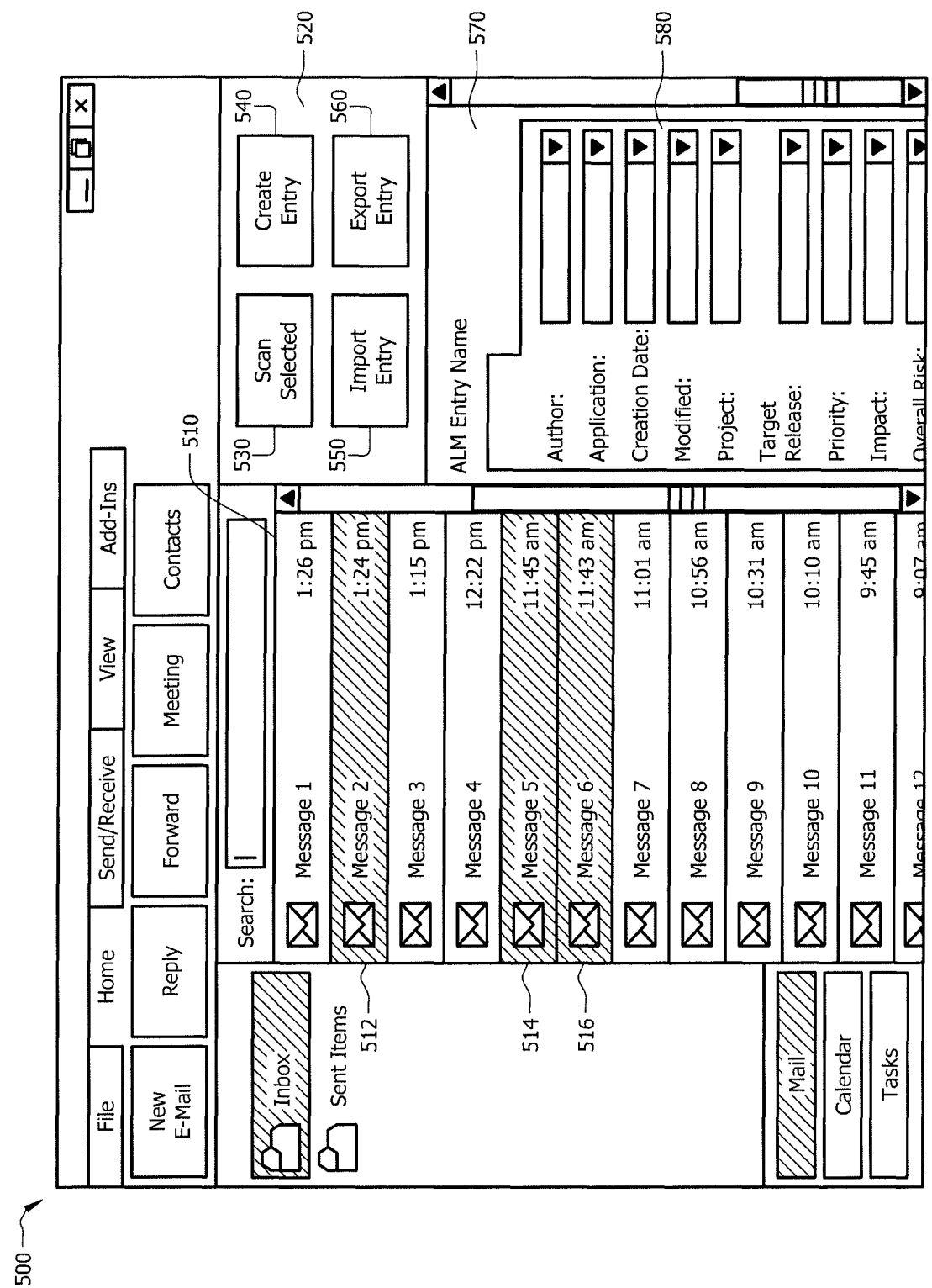
FIG. 5 illustrates an interface for capturing and tracking ALM data.

FIG. 5 illustrates an interface 500 for capturing and tracking ALM data. Interface 500 is depicted as an e-mail application implemented on computer 12. For example, interface 500 may be displayed on GUI 14 of computer 12. Interface 500 may be implemented as a database entry application that may support message data (e.g., e-mail messages, instant messages, voicemail messages, or other suitable messages) retrieval and processing. However, any other suitable software interface may be utilized for capturing and tracking ALM data. Interface 500 includes an e-mail message window 510, an ALM function window 520, and an ALM entry window 570. Any suitable arrangement may be used, and less than all of the windows may be displayed at once within interface 500.

E-mail message window 510 includes a list of e-mail messages available for viewing. The displayed messages may have been received from a communication module, such as communication module 20, and are associated with an account of the user operating computer 12 on which interface 500 is implemented. The user may select one or more messages within e-mail message window 510. For the purposes of illustration, messages 512, 514, and 516 are depicted as having been selected by the user, as indicated by shading.

In one embodiment, ALM function window 520 provides the functionality of data entry module 68 and tracking module 70. In the illustrated embodiment, ALM function window 520 is implemented as a plug-in for an e-mail application. ALM function window 520 may include buttons, such as buttons 530, 540, 550, and 560, that implement the functionality of data entry module 68 and tracking module 70.

In one embodiment, if the user selects "scan selected" button 530, the selected e-mails in e-mail message window 510 are processed. In one embodiment, the selection of button 530 causes e-mails messages 512, 514, and 516 to be transmitted to and/or processed by ALM automation platform 30 and added to message queue 72. E-mail messages 512, 514, and 516 may be retrieved from communication module 20 and communicated to message queue 72 of ALM automation platform 30. In one embodiment, e-mail messages 512, 514, and 516 are stored locally on computer 12 and transmitted to message queue 72 of ALM automation platform 30 in response to the selection of button 530. Once messages 512, 514, and 516 have been added to message queue 72, messages 512, 514, and 516 are processed to identify relevant parameters for entry into ALM module 40. In one embodiment, analysis of selected e-mails is performed on computer 12 directly. For example, computer 12 may implement tracking module 70 as a software application or plug-in that scans e-mail messages 512, 514, and 516 in response to the selection of button 530. In one embodiment, once a scan is completed, fields of a currently opened database entry template may be populated based on data identified in e-mail messages 512, 514, and 516. In another embodiment, if no database entry template is opened, a new template may be generated and populated.

In one embodiment, if the user selects "create entry" button 540, a new database entry template may be generated. For example, ALM entry window 570 is depicted as including an empty database entry template 580, which may have been generated in response to a user selection of button 540. In some embodiments, the fields of template 580 may include default entries, which may be pre-defined entries associated with ALM module 40.

In one embodiment, if the user selects "import entry" button 550, a window may be generated for display by interface 500 that allows the user to select a pre-existing database entry for editing. Data from the database entry may then be displayed in ALM entry window 570 as a populated template.

In one embodiment, if the user selects "export entry" button 560, the populated template may be transmitted to ALM module 40. In one embodiment, the template is transmitted from ALM automation platform 30 to ALM module 40. In another embodiment, the template is transmitted from computer 12 to ALM module 40.

Buttons 530, 540, 550, and 560 are illustrative of the functionality of ALM automation platform 30. In some embodiments, interface 500 includes less than all of buttons 530, 540, 550, and 560. For example, a single button may be present that has the functionality of two or more of buttons 530, 540, 550, and 560. In this example, a single button may import and create a database entry template, scan selected e-mails, populate the template, and export information to ALM module 40 according to any of the embodiments of ALM automation platform 30. In some embodiments, other suitable methods of implementing the functionality may be provided by interface 500 in addition to or in lieu of selectable buttons, such as the use of hot-keys, drop-down menus, or voice commands. In some embodiments, messages are automatically scanned in response to selection of a message, rather than selecting one or more messages first and then receiving an indication from the user to perform the scan.

Certain embodiments of the present disclosure may provide one or more technical advantages. A technical advantage of one embodiment includes automatically determining an issue, defect, and/or requirement of the lifecycle of application development by analyzing electronic messages. Another technical advantage of an embodiment includes recording each issue, defect, and/or requirement in a lifecycle management tool for additional analysis, reporting, and maintenance. Yet another technical advantage of an embodiment includes tracking each issue, defect, and/or requirement associated with application development.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method comprising:
receiving, from one or more computers, a plurality of electronic messages containing relevant and non-relevant data, said relevant data comprising at least project information associated with an application development project, said project information including project details, project defects, project priorities, and project statuses associated with developmental lifecycle of at least one software application;
identifying terms, phrases, or values associated with the project information within the relevant data;
generating, by a processor, one or more scanning parameters associated with identifying said project information contained in the plurality of electronic messages, wherein the one or more scanning parameters are based on an adjacency between a keyword associated with the application development project and the identified terms, phrases, or values associated with the project information within the relevant data;
generating, by the processor, a database entry template for an application lifecycle management module;
receiving, by the processor via a graphical user interface, at least one selection of an electronic message for analysis from among the plurality of electronic messages;
analyzing, by the processor, the selected electronic message according to the one or more generated scanning parameters to identify relevant data within the electronic message; and
populating fields of the database entry template based on the identified relevant data.

2. The method of claim 1, further comprising:
determining that a database entry is stored in the application lifecycle management module; and
generating the database entry template according to the stored database entry.

3. The method of claim 1, further comprising:
determining that a database entry in the application lifecycle management module exists for the generated database entry template; and
communicating the database entry and the populated generated database entry template to the one or more computers.

4. The method of claim 1, further comprising:
determining that a database entry in the application lifecycle management module exists for the generated database entry template; and communicating, to a user, an update for the database entry according to the populated fields in the database entry template.

5. The method of claim 1, further comprising:
creating a new database entry in the application lifecycle management module based on the generated database entry template.

6. The method of claim 5, further comprising:
communicating a notification to the one or more computers indicating creation of the new database entry; and
communicating the new database entry to the application lifecycle management module.

7. The method of claim 1, further comprising:
receiving a user input from the computer to perform an operation on one or more of the plurality of electronic messages; and
generating the database entry template in response to receiving the user input.

8. Non-transitory computer readable medium comprising logic, the logic, when executed by a processor, operable to:
receive, from one or more computers, a plurality of electronic messages containing
relevant and non-relevant data, said relevant data comprising at least project information associated with an application development project, said project information including project details, project defects, project priorities, and project statuses associated with the developmental lifecycle of at least one software application;
identify terms, phrases, or values associated with the project information within the relevant data;
generate one or more scanning parameters associated with identifying said project information contained in the plurality of electronic messages, wherein the one or more scanning parameters are based on an adjacency between a keyword associated with the application development project and the identified terms, phrases, or values associated with the project information within the relevant data;
generate a database entry template for an application lifecycle management module;
receive, via a graphical user interface, at least one selection of an electronic message for analysis from among the plurality of electronic messages;
analyze the selected electronic message according to the one or more generated scanning parameters to identify relevant data within the electronic message; and
populate fields of the database entry template based on the identified data.

9. The non-transitory computer readable medium of claim 8, wherein the logic is further operable to:
determine that a database entry is stored in the application lifecycle management module; and
generate the database entry template according to the stored database entry.

10. The non-transitory computer readable medium of claim 8, wherein the logic is further operable to:
determine that a database entry in the application lifecycle management module exists for the generated database entry template; and
communicate the database entry and the populated generated database entry template to the one or more computers.

11. The non-transitory computer readable medium of claim 8, wherein the logic is further operable to:
determine that a database entry in the application lifecycle management module exists for the generated database entry template; and
communicate, to a user, an update for the database entry according to the populated fields in the database entry template.

12. The non-transitory computer readable medium of claim 8, wherein the logic is further operable to create a new database entry in the application lifecycle management module based on the generated database entry template.

13. The non-transitory computer readable medium of claim 12, wherein the logic is further operable to:
communicate a notification to the one or more computers indicating creation of the new database entry; and
communicate the new database entry to the application lifecycle management module.

14. The non-transitory computer readable medium of claim 8, wherein the logic is further operable to:
receive a user input from the computer to perform an operation on one or more of the plurality of electronic messages; and
generate the database entry template in response to receiving the user input.

15. A system comprising:
an interface operable to receive, from one or more computers, a plurality of electronic messages containing relevant and non-relevant data comprising at least project information associated with an application development project, said project information including project details, project defects, project priorities, and project statuses associated with development lifecycle of at least one software application;
a processor communicatively coupled to the interface and the processor is operable to:
identify terms, phrases, or values associated with the project information within the relevant data;
generate one or more scanning parameters associated with identifying said project information contained in the plurality of electronic messages, wherein the one or more scanning parameters are based on an adjacency between a keyword associated with the application development project and the identified terms, phrases, or values associated with the project information within the relevant data;
generate a database entry template for an application lifecycle management module;
receive, via a graphical user interface, at least one selection of an electronic message for analysis from among the plurality of electronic messages;
analyze the selected electronic message according to the one or more generated scanning parameters to identify relevant data within the electronic message; and
populate fields of the database entry template based on the identified data.

16. The system of claim 15, wherein the processor is further operable to:
determine that a database entry is stored in the application lifecycle management module; and
generate the database entry template according to the stored database entry.

17. The system of claim 15, wherein: the processor is further operable to determine that a database entry in the application lifecycle management module exists for the generated database entry template; and the interface is further operable to communicate the database entry and the populated generated database entry template to the one or more computers.

18. The system of claim 15, wherein: the processor is further operable to determine that a database entry in the application lifecycle management module exists for the generated database entry template; and the interface is further operable to communicate an update for the database entry according to the populated fields in the database entry template.

19. The system of claim 15, wherein the processor is further operable to create a new database entry in the application lifecycle management module based on the generated database entry template.

20. The system of claim 19, wherein the interface is further operable to:
communicate a notification to the one or more computers indicating creation of the new database entry; and
communicate the new database entry to the application lifecycle management module.

21. The system of claim 15, wherein: the interface is further operable to receive a user input from the computer to perform an operation on one or more of the plurality of electronic messages; and the processor is further operable to generate the database entry template in response to receiving the user input.

* * * * *